US009432884B2

(12) United States Patent
Xu et al.

(10) Patent No.: US 9,432,884 B2
(45) Date of Patent: *Aug. 30, 2016

(54) METHOD FOR PROCESSING IN-DEVICE COEXISTENCE CONFIGURATION INFORMATION, APPARATUS AND SYSTEM

(71) Applicant: FUJITSU LIMITED, Kawasaki-shi, Kanagawa (JP)

(72) Inventors: Haibo Xu, Beijing (CN); Ningjuan Chang, Beijing (CN); Weiwei Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/591,518

(22) Filed: Jan. 7, 2015

(65) Prior Publication Data
US 2015/0208284 A1 Jul. 23, 2015

Related U.S. Application Data

(63) Continuation of application No. 14/566,150, filed on Dec. 10, 2014, which is a continuation of application No. PCT/CN2012/077663, filed on Jun. 27, 2012.

(51) Int. Cl.
H04W 36/00 (2009.01)
H04L 12/24 (2006.01)
(Continued)

(52) U.S. Cl.
CPC ...... H04W 36/0016 (2013.01); H04L 41/0806 (2013.01); H04W 36/0055 (2013.01);
(Continued)

(58) Field of Classification Search
CPC ............. H04W 7/04; H04W 72/0406; H04W 72/0413; H04W 72/042; H04W 72/0426; H04W 72/082; H04W 72/1215; H04W 36/0083; H04W 36/0088; H04W 36/0094; H04W 36/14
USPC ................ 455/436, 437, 438, 450, 448, 451
See application file for complete search history.

(56) References Cited

U.S. PATENT DOCUMENTS

2009/0046656 A1 2/2009 Kitazoe et al.
2012/0178456 A1* 7/2012 Peisa ..................... H04W 8/245
455/436

(Continued)

FOREIGN PATENT DOCUMENTS

CN 101064943 A 10/2007
CN 101998557 A 3/2011
(Continued)

OTHER PUBLICATIONS

International Search Report issued for corresponding International Patent Application No. PCT/CN2012/077663, mailed Apr. 4, 2013, with an English translation.
(Continued)

Primary Examiner — Jean Gelin
(74) Attorney, Agent, or Firm — Myers Wolin, LLC

(57) ABSTRACT

A method for processing in-device coexistence configuration information, apparatus and system. The method includes: notifying, by a source base station to a target base station, first in-device coexistence configuration information configured by the source base station for terminal equipment, when handover from the source base station to the target base station occurs in the terminal equipment. In this way, the source base station may notify the first in-device coexistence configuration information configured by it for the terminal equipment to the target base station; the target base station receives the first in-device coexistence configuration information, determines whether to configure the terminal equipment with in-device coexistence configuration information, and then notifies the source base station of related configuration information via a handover command. Wherein, when handover occurs in the terminal equipment, the in-device coexistence configuration information may be processed effectively.

5 Claims, 8 Drawing Sheets

(51) Int. Cl.
  *H04W 76/02*  (2009.01)
  *H04W 76/04*  (2009.01)
  H04W 88/02  (2009.01)
  H04W 88/08  (2009.01)
  H04W 88/06  (2009.01)

(52) U.S. Cl.
  CPC ......... *H04W76/028* (2013.01); *H04W 76/046* (2013.01); *H04W 88/02* (2013.01); *H04W 88/06* (2013.01); *H04W 88/08* (2013.01)

(56) References Cited

U.S. PATENT DOCUMENTS

| | | | | |
|---|---|---|---|---|
| 2013/0029704 A1* | 1/2013 | Koo | .................. | H04W 72/1215 455/501 |
| 2013/0114583 A1* | 5/2013 | Park | .................. | H04W 52/0216 370/338 |
| 2013/0203418 A1* | 8/2013 | Jang | ...................... | H04W 36/20 455/436 |
| 2013/0242860 A1* | 9/2013 | Kim | ...................... | H04W 36/20 370/328 |
| 2013/0279423 A1* | 10/2013 | Ahn | ...................... | H04W 24/02 370/328 |
| 2013/0322260 A1* | 12/2013 | Yao | ..................... | H04W 72/082 370/241 |
| 2014/0010205 A1* | 1/2014 | Sebire | ............... | H04W 36/0083 370/331 |
| 2014/0022972 A1* | 1/2014 | Ahn | .................. | H04W 36/0072 370/311 |
| 2015/0117286 A1* | 4/2015 | Kim | .................. | H04W 52/0216 370/311 |
| 2015/0181461 A1* | 6/2015 | Kim | ...................... | H04W 74/08 370/236 |
| 2015/0201449 A1* | 7/2015 | Jung | .................. | H04W 72/082 370/329 |

FOREIGN PATENT DOCUMENTS

| | | |
|---|---|---|
| CN | 102123517 A | 7/2011 |
| CN | 102263720 A | 11/2011 |
| JP | 2010-531117 A | 9/2010 |
| WO | 2012/010104 A1 | 1/2012 |

OTHER PUBLICATIONS

Non-Final Office Action issued by the United States Patent and Trademark Office for corresponding U.S. Appl. No. 14/566,150, electronically delivered on Nov. 19, 2015.

The Office Action issued for corresponding Japanese Patent Application No. 2015-518757 mailed on Mar. 29, 2016 with an English translation.

LG Electronics Inc.: "Configuration of IDC indication",3GPP TSG-RAN2 Meeting #77bis R2-122856, Prague, Czech, May 21-26, 2012, Cited in Office Action issued for corresponding Japanese Patent Application No. 2015-518757 mailed on Mar. 29, 2016.

* cited by examiner

METHOD FOR PROCESSING IN-DEVICE COEXISTENCE CONFIGURATION INFORMATION, APPARATUS AND SYSTEM

CROSS-REFERENCE TO RELATED APPLICATIONS

This application is a continuation of U.S. application Ser. No. 14/566,150, filed Dec. 10, 2014, now pending, which is a continuation of International Application No. PCT/CN2012/077663, filed on Jun. 27, 2012, the contents of each are herein wholly incorporated by reference.

TECHNICAL FIELD

The present disclosure relates to the field of communications, and in particular to a method for processing in-device coexistence configuration information, apparatus and system.

BACKGROUND

In order to achieve network access everywhere, terminal equipment needs to be equipped with multiple sets of transceivers for accessing various networks. For example, the terminal equipment may be simultaneously equipped with transceivers of a long-term evolution (LTE) system and an industrial scientific medical (ISM) system (such as wireless fidelity (WiFi), and Bluetooth, etc.), etc. As multiple sets of transceivers in the same terminal equipment are very close to each other, power of a transmitter of a system may be much higher than that of a receiver of another system.

FIG. 1 gives an example of interference coexistence. As shown in FIG. 1, the terminal equipment may include an LTE system, a global positioning system (GPS) and a Bluetooth/WiFi system, wherein the LTE system may bring interference to the Bluetooth/WiFi system, and the Bluetooth/WiFi system may also bring interference to the LTE system. If working bands of different systems are spaced relatively far away from each other, interference brought by a transmission signal to a reception signal may be well controlled by using a filtering technology.

For some scenarios, for example, when working bands of different systems in the same terminal equipment are very close to each other, the current filtering technology is insufficient to provide effective interference avoidance. Hence, for such scenarios, in order to achieve interference avoidance in coexistence of multiple system transceivers in terminal equipment, other methods than the filtering technology need to be taken into account.

Currently, following scenarios of system coexistence are mainly taken into account in 3GPP:

1) LTE and WiFi system coexist;
2) LTE and Bluetooth system coexist; and
3) LTE and global navigation satellite system (GNSS) coexist.

However, in the implementation of the present disclosure, the inventors found that when handover or RRC connection reestablishment occurs to terminal equipment, there exists no effective method for processing in-device coexistence configuration information in the terminal equipment at present.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Embodiments of the present disclosure provide a method for processing in-device coexistence configuration information, apparatus and system; wherein a source base station may notify first in-device coexistence configuration information configured by it for terminal equipment to a target base station. In this way, the target base station receives the first in-device coexistence configuration information, determines whether to configure the terminal equipment with in-device coexistence configuration information, and then notifies the source base station of related configuration information via a handover command, so that the terminal equipment performs corresponding processing to the in-device coexistence configuration information according to the handover command.

According to an aspect of the embodiments of the present disclosure, there is provided a method for processing in-device coexistence configuration information, including:

notifying, by a source base station to a target base station, first in-device coexistence configuration information configured by the source base station for a terminal equipment in handover preparation signaling, when handover from the source base station to the target base station occurs to the terminal equipment According to another aspect of the embodiments of the present disclosure, there is provided a method for processing in-device coexistence configuration information, including:

receiving, by a target base station, first in-device coexistence configuration information configured by a source base station for a terminal equipment and transmitted by the source base station, when handover from the source base station to the target base station occurs to the terminal equipment; and not containing second in-device coexistence configuration information in a handover command by the target base station, when the target base station is determined to configure the terminal equipment with the second in-device coexistence configuration information and a value of the configured second in-device coexistence configuration information is identical to that of the first in-device coexistence configuration information.

According to still another aspect of the embodiments of the present disclosure, there is provided a method for processing in-device coexistence configuration information, including:

receiving, by a terminal equipment, a handover command transmitted by a source base station; and determining that a value of second in-device coexistence configuration information configured by a target base station for the terminal equipment is identical to that of first in-device coexistence configuration information configured by the source base station for the terminal equipment, when the second in-device coexistence configuration information and an information element "fullConfig" are not contained in the handover command.

According to still another aspect of the embodiments of the present disclosure, there is provided a base station, including:

a first notifying unit configured to notify to a target base station, first in-device coexistence configuration information configured by the base station for a terminal equipment, when handover from the base station to the target base station occurs to the terminal equipment.

According to still another aspect of the embodiments of the present disclosure, there is provided a terminal equipment, handed over from a source base station to a target base station, the terminal equipment including:

a third receiving unit configured to receive a handover command transmitted by a source base station; and a fourth processing unit configured to determine that a value of second in-device coexistence configuration information configured by a target base station for the terminal equipment is identical to that of first in-device coexistence configuration information configured by the source base station for the terminal equipment, when the second in-device coexistence configuration information and an information element "fullConfig" are not contained in the handover command.

According to still another aspect of the embodiments of the present disclosure, there is provided a network system, including a terminal equipment, a source base station and a target base station, wherein, the source base station is configured to notify first in-device coexistence configuration information configured by the source base station for the terminal equipment to the target equipment, receive a handover command transmitted by the target base station, and transmit the handover command to the terminal equipment;

the target base station is configured to receive the first in-device coexistence configuration information, and when the target base station is determined to configure the terminal equipment with the second in-device coexistence configuration information and a value of the configured second in-device coexistence configuration information is identical to that of the first in-device coexistence configuration information, the target base station contains no second in-device coexistence configuration information in the handover command and transmits the handover command to the source base station;

and the terminal equipment is configured to receive the handover command transmitted by the source base station, and determine that a value of second in-device coexistence configuration information configured by the target base station for the terminal equipment is identical to that of the first in-device coexistence configuration information configured by the source base station for the terminal equipment, when the second in-device coexistence configuration information and an information element "fullConfig" are not contained in the handover command.

According to still another aspect of the embodiments of the present disclosure, there is provided a computer-readable program, wherein when the program is executed in a base station, the program enables a computer to carry out the method for processing in-device coexistence configuration information as described above in the base station.

According to still another aspect of the embodiments of the present disclosure, there is provided a storage medium in which a computer-readable program is stored, wherein the computer-readable program enables a computer to carry out the method for processing in-device coexistence configuration information as described above in a base station.

According to still another aspect of the embodiments of the present disclosure, there is provided a computer-readable program, wherein when the program is executed in terminal equipment, the program enables a computer to carry out the method for processing in-device coexistence configuration information as described above in the terminal equipment.

According to still another aspect of the embodiments of the present disclosure, there is provided a storage medium in which a computer-readable program is stored, wherein the computer-readable program enables a computer to carry out the method for processing in-device coexistence configuration information as described above in terminal equipment.

According to still another aspect of the embodiments of the present disclosure, there is provided a method for processing in-device coexistence configuration information, including:

releasing, by a terminal equipment, in-device coexistence configuration information configured by a serving base station for the terminal equipment, when the terminal equipment initiates connection reestablishment.

According to still another aspect of the embodiments of the present disclosure, there is provided terminal equipment, including:

a seventh processing unit configured to release in-device coexistence configuration information configured by a serving base station for the terminal equipment, when the terminal equipment initiates connection reestablishment.

According to still another aspect of the embodiments of the present disclosure, there is provided a network system, including a base station, wherein the system further includes terminal equipment, the terminal equipment being the terminal equipment as described above.

According to still another aspect of the embodiments of the present disclosure, there is provided a computer-readable program, wherein when the program is executed in terminal equipment, the program enables a computer to carry out the method for processing in-device coexistence configuration information as described above in the terminal equipment.

According to still another aspect of the embodiments of the present disclosure, there is provided a storage medium in which a computer-readable program is stored, wherein the computer-readable program enables a computer to carry out the method for processing in-device coexistence configuration information as described above in terminal equipment.

An advantage of the embodiments of the present disclosure exists in that the source base station may notify the first in-device coexistence configuration information configured by it for the terminal equipment to the target base station; in this way, the target base station receives the first in-device coexistence configuration information, determines whether to configure the terminal equipment with in-device coexistence configuration information, and then notifies the source base station of related configuration information via a handover command, so that the terminal equipment performs corresponding processing to the in-device coexistence configuration information according to the handover command.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The above and other objects, features and advantages of the present disclosure will be apparent from the following detailed description in conjunction with the drawings, in which.

DETAILED DESCRIPTION

Various embodiments of the present disclosure are described as follows with reference to the drawings. These embodiments are illustrative only, and are not intended to limit the present disclosure. For the principle and modes of implementation of the present disclosure to be easily understood by those skilled in the art, the modes of implementation of the present disclosure shall be described taking interference indication of an LTE system as an example. However, it should be understood that the present disclosure is not limited to the above system, and is applicable to other systems related to interference indication.

Currently, when there exists coexistence interference in terminal equipment and such a problem cannot be solved by the terminal equipment itself, the terminal equipment needs to report related information to a base station. For example, current unavailable frequency information of evolved universal terrestrial radio access (E-UTRA) resulted from coexistence interference, and time division multiplex and multiplexer (TDM) information suggested by the terminal equipment to be configured by the base station for its LTE and ISM systems, etc., are notified to the base station. The information here reported by the terminal equipment is referred to as in-device coexistence (IDC) indication. Thereafter, the base station may decide which manner is used to help the terminal equipment to solve the coexistence interference according to the IDC indication reported by the terminal equipment. For example, the base station may hand over the terminal equipment to a frequency with no in-device coexistence interference, or configure the terminal equipment with suitable discontinuous reception (DRX), so that its LTE and ISM systems operate in a manner of TDM.

Figure 1:
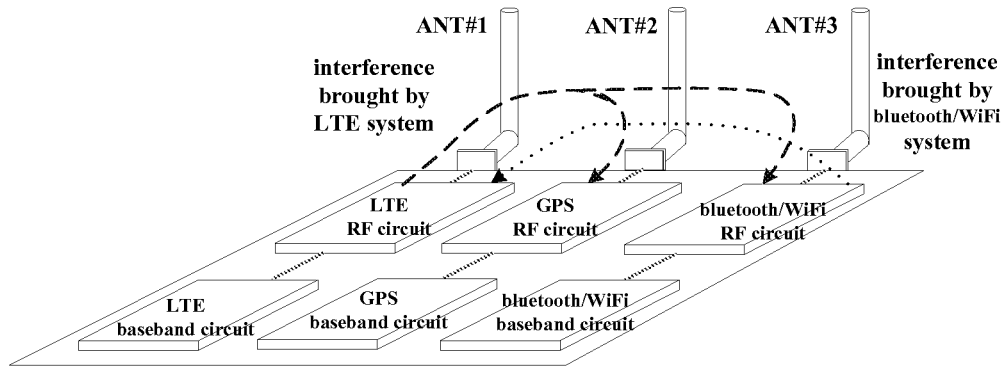
FIG. 1 is an example of interference coexistence.
Figure 2:
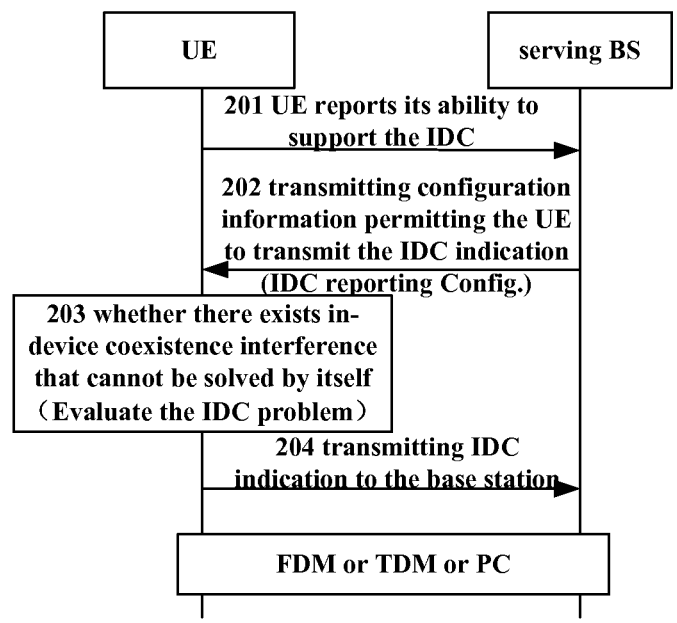
FIG. 2 is a flowchart of current in-device interference indication.

As the IDC indication is new uplink signaling defined in Rel-11, base stations before Rel-11 cannot interpret such signaling. Therefore, when terminal equipment of Rel-11 enters into a base station before Rel-11, if the terminal equipment transmits IDC indication, the base station cannot give any response information. This will result in continuous transmission of IDC indication by the terminal equipment. Currently, such a problem is solved in the following manners: first, terminal equipment (UE) having an IDC ability needs to report its ability to support the IDC to the base station (see step 201), and then the base station will judge whether to permit the terminal equipment to transmit IDC indication. If the terminal equipment is permitted to transmit the IDC indication, configuration information permitting the terminal equipment to transmit the IDC indication is transmitted to the terminal equipment (see step 202); only when the terminal equipment receives permission for transmitting the IDC indication configured by the base station for it, the terminal equipment determines whether there exists in-device coexistence interference that cannot be solved by itself (see step 203); and when the terminal equipment determines that there exists in-device coexistence interference that cannot be solved by itself, the terminal equipment transmits the IDC indication. Basic procedures are as shown in FIG. 2.

In step 202, the configuration information permitting the terminal equipment to transmit the IDC indication transmitted by the base station to the terminal equipment belongs to in-device coexistence configuration information.

Furthermore, the base station may configure the terminal equipment with configuration information controlling a frequency of the terminal equipment in transmitting in-device coexistence indication.

Furthermore, in some cases, in order to correctly receive some important downlink signaling of the ISM, the terminal equipment needs to perform autonomous denial of uplink signal transmission of the LTE system. In order to control the number of times of autonomous denial of uplink signal transmission of the LTE system within a period of time by the terminal equipment, the base station may configure the terminal equipment with two parameters: time and number of times.

In this way, besides the configuration information on whether permitting the terminal equipment to transmit the in-device coexistence indication, the in-device coexistence configuration information may further include: configuration information controlling a frequency of the terminal equipment in transmitting in-device coexistence indication configured by the base station for the terminal equipment, and configuration information controlling the terminal equipment to perform autonomous denial of uplink signal transmission of the LTE system.

After defining the in-device coexistence configuration information, it is further needed to consider a problem of how to process the in-device coexistence configuration information in the following two scenarios:

scenario 1: handover occurs to the terminal equipment; after the terminal equipment is handed over from a source base station to a new target base station, how the terminal equipment obtains configuration information applied by the target base station to its in-device coexistence; and scenario 2: RRC connection reestablishment occurs to the terminal equipment; after the terminal equipment initiates RRC connection reestablishment, how the terminal equipment processes the in-device coexistence configuration information configured by the source base station for it.

Embodiments of the present disclosure provide methods for solving the above problems. Processing methods in the above two scenarios shall be described below in detail with reference to the drawings.

Embodiment 1 of the present disclosure provides a method for processing in-device coexistence configuration information. When handover from the source base station to the target base station occurs to the terminal equipment, for the source base station, the method includes: notifying, by the source base station to the target base station, first in-device coexistence configuration information configured by the source base station for the terminal equipment.

In this embodiment, the first in-device coexistence configuration information includes first configuration information, and/or second configuration information, and/or third configuration information; wherein, the first configuration information refers to configuration information on whether the source base station permits the terminal equipment to transmit in-device coexistence indication (IDC indication) to the source base station;

the second configuration information refers to configuration information configured by the source base station for the terminal equipment and used to control a frequency of the terminal equipment in transmitting in-device coexistence indication;

in this embodiment, in order to control a frequency of the terminal equipment in transmitting the in-device coexistence indication, in a mode of implementation, for example, the base station may configure the terminal equipment with an in-device coexistence indication transmission-prohibiting timer; after the terminal equipment transmits the in-device coexistence indication, the prohibiting timer is started; during operation of the prohibiting timer, the terminal equipment is not permitted to transmit in-device coexistence indication once again, or is only permitted to transmit in-device coexistence indication different from the in-device coexistence indication that is transmitted at the last time; for such a mode of implementation, the "configuration information controlling a frequency of the terminal equipment in transmitting in-device coexistence indication" is a value of the configured in-device coexistence indication transmission-prohibiting timer;

and the third configuration information refers to configuration information configured by the source base station for the terminal equipment and used to perform autonomous denial of uplink signal transmission of an LTE system for the terminal equipment.

In this embodiment, in order to control the terminal equipment to perform autonomous denial of uplink signal transmission of the LTE system, in a mode of implementation, for example, the base station may configure the terminal equipment with a number of times of being permitted to perform autonomous denial of uplink signal transmission of the LTE system within a period of time; for example, the base station may configure that the terminal equipment may only reject uplink signal transmission of the LTE system for 10 times within 1 second; for such a mode of implementation, the "configuration information controlling the terminal equipment to perform autonomous denial of uplink signal transmission of the LTE system" is the configured time period and the number of times.

In this embodiment, the source base station may contain the first in-device coexistence configuration information in handover preparation signaling for notifying the target base station. In this embodiment, the first in-device coexistence configuration information may be configured in information element "OtherConfig", or in information element "MeasConfig", or in information element "MeasObjectEUTRAConfig", or in information element "RadioResourceConfig Dedicated"; or the in-device coexistence configuration information is contained in "RRCConnectionReconfiguration" and "AS-Config" as an independent information element.

In this embodiment, the method may further include: receiving a handover command transmitted by the target base station in response to the handover preparation signaling notified by the source base station, and notifying the handover command to the terminal equipment. Wherein, the source base station may transmit the response message to the terminal equipment via the handover command.

It can be seen from the above embodiment that the source base station may notify the first in-device coexistence configuration information configured by it for the terminal equipment to the target base station; the target base station receives the first in-device coexistence configuration information, determines whether to configure the terminal equipment with in-device coexistence configuration information, and then notifies the source base station of related configuration information via a handover command.

Figure 3:
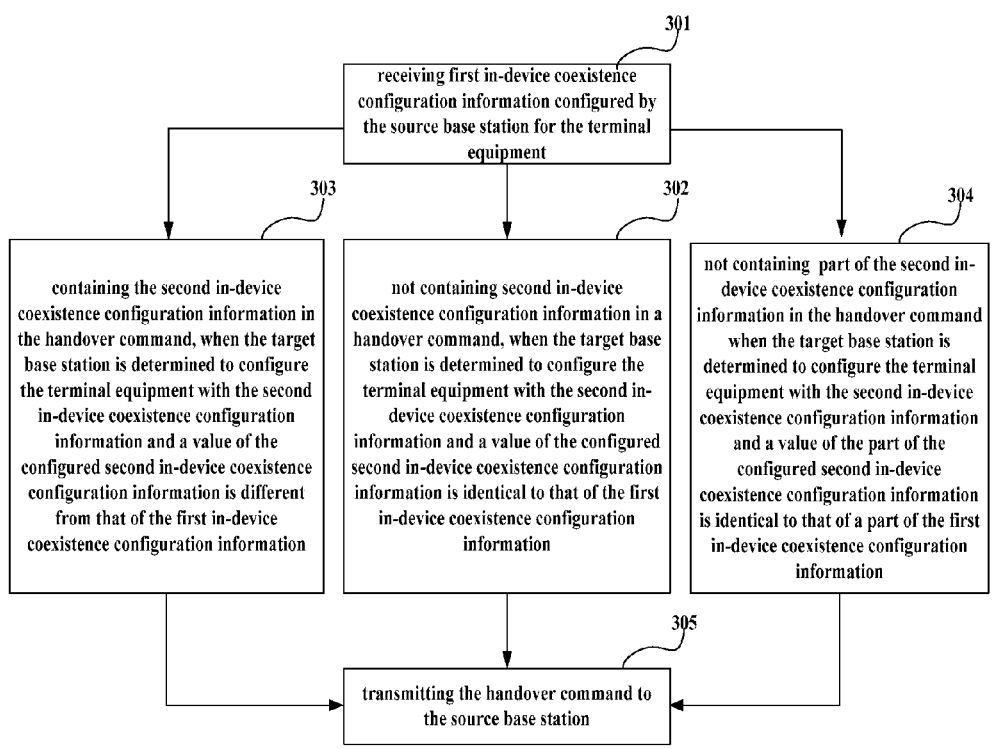
FIG. 3 is a flowchart of a method for processing in-device coexistence configuration information of Embodiment 2 of the present disclosure.

FIG. 3 is a flowchart of a method for processing in-device coexistence configuration information of Embodiment 2 of the present disclosure. As shown in FIG. 3, when handover from a source base station to a target base station occurs to terminal equipment, the method includes:

step 301: receiving, by the target base station, first in-device coexistence configuration information configured by the source base station for the terminal equipment and transmitted by the source base station;

in this embodiment, the first in-device coexistence configuration information is as described in Embodiment 1, which shall not be described herein any further;

step 302: not containing second in-device coexistence configuration information in a handover command by the target base station, when the target base station is determined to configure the terminal equipment with the second in-device coexistence configuration information and a value of the configured second in-device coexistence configuration information is identical to that of the first in-device coexistence configuration information;

in this embodiment, the second in-device coexistence configuration information may include, for example, fourth configuration information, and/or fifth configuration information, and/or sixth configuration information; wherein, the fourth configuration information refers to configuration information on whether the target base station permits the terminal equipment to transmit in-device coexistence indication to the target base station; the fifth configuration information refers to configuration information configured by the target base station for the terminal equipment controlling a frequency of the terminal equipment in transmitting in-device coexistence indication; and the sixth configuration information refers to configuration information configured by the target base station for the terminal equipment performing autonomous denial of uplink signal transmission of an LTE system for the terminal equipment;

in such a case, when the terminal equipment receives the handover command via the source base station, it may be determined that the value of the first in-device coexistence configuration information may be used.

In this embodiment, as shown in FIG. 3, the method may further include:

step 303: containing the second in-device coexistence configuration information in the handover command by the target base station, when the target base station is determined to configure the terminal equipment with the second in-device coexistence configuration information and a value of the configured second in-device coexistence configuration information is different from that of the first in-device coexistence configuration information.

In such a case, when the terminal equipment receives the handover command via the source base station, it may be determined that the second in-device coexistence configuration information may be used.

In this embodiment, as shown in FIG. 3, when the second in-device coexistence configuration information contains more than one pieces of information, the method may further include:

step 304: containing part of the second in-device coexistence configuration information, a value of which being different from that of the first in-device coexistence configuration information, in a handover command, but not containing part of the second in-device coexistence configuration information, a value of which being identical to that of the first in-device coexistence configuration information, in the handover command by the target base station, when the target base station is determined to configure the terminal equipment with the second in-device coexistence configuration information and a value of the part of the configured second in-device coexistence configuration information is identical to that of a part of the first in-device coexistence configuration information.

In such a case, when the terminal equipment receives the handover command via the source base station, the part of the second in-device coexistence configuration information contained in the handover command may be used, and for part of the information not contained in the handover command, it may be determined that the value of the first in-device coexistence configuration information may be used.

For example, the second in-device coexistence configuration information contains the above fourth configuration information, fifth configuration information and sixth configuration information; wherein if values of the fourth configuration information and the fifth configuration information are identical to the values of the first configuration information and the second configuration information in the first in-device coexistence configuration information, and a value of the sixth configuration information is different from that of the third configuration information, the sixth configuration information is contained in the handover command, while the fourth configuration information and the fifth configuration information are not contained. When the terminal equipment receives the handover command, the sixth configuration information contained in the handover command may be applied; and for the fourth configuration information and the fifth configuration information not contained in the handover command, the values of the first configuration information and the second configuration information in the first in-device coexistence configuration information may be used.

In this embodiment, the method may further include:

step 305: transmitting the handover command to the source base station;

wherein, for the above three cases, contents related to the in-device coexistence configuration information contained in the handover command are different; that is, in the first case in step 302, the second in-device coexistence configuration information is not contained; in the second case in step 303, the second in-device coexistence configuration information is contained; and in the case in step 304, a part of the second in-device coexistence configuration information is contained. The handover command may be transmitted by the source base station to the terminal equipment.

Figure 4:
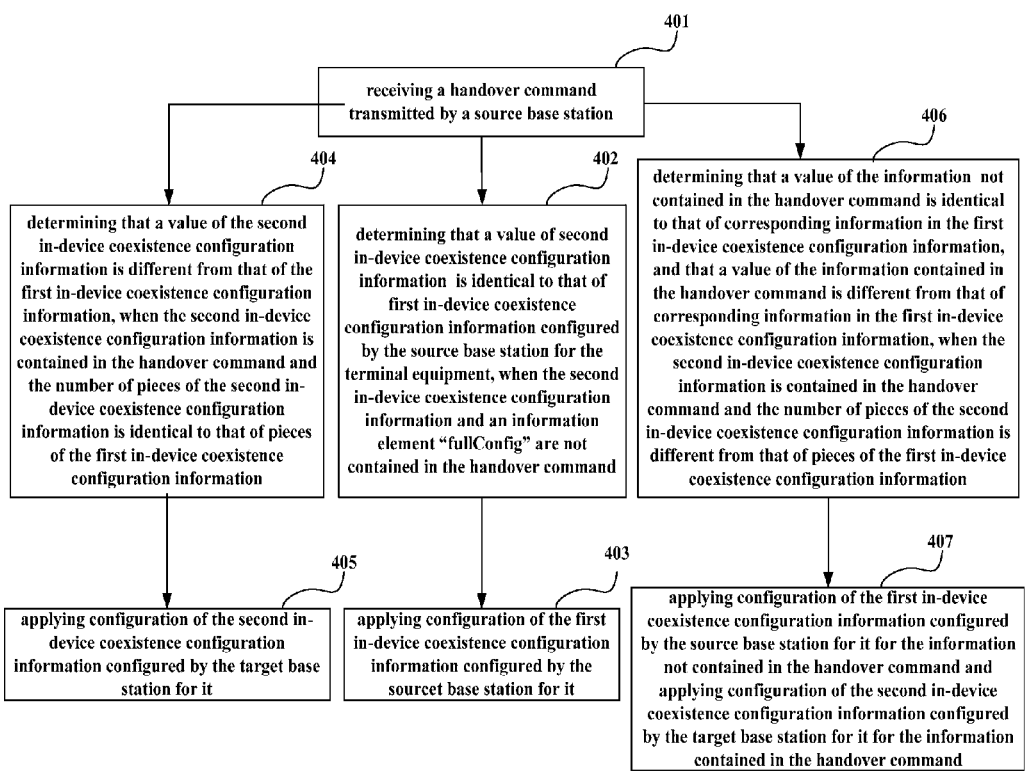
FIG. 4 is a flowchart of a method for processing in-device coexistence configuration information of Embodiment 3 of the present disclosure.

FIG. 4 is a flowchart of a method for processing in-device coexistence configuration information of Embodiment 3 of the present disclosure. As shown in FIG. 4, the method includes:

step 401: receiving, by terminal equipment, a handover command transmitted by a source base station; and step 402: determining by the terminal equipment that a value of second in-device coexistence configuration information configured by a target base station for the terminal equipment is identical to that of first in-device coexistence configuration information configured by the source base station for the terminal equipment, when the second in-device coexistence configuration information and an information element "fullConfig" are not contained in the handover command;

in this case, after the terminal equipment is handed over to the target base station, configuration of the first in-device coexistence configuration information configured by the source base station for the terminal equipment is applied (see step 403);

for example, if the configuration of the first in-device coexistence configuration information configured by the source base station for the terminal equipment is first configuration information, such as the terminal equipment is permitted to transmit IDC information to it; in such a case, the terminal equipment may apply the configuration of the first in-device coexistence configuration information, that is, "permitting the terminal equipment to transmit IDC information to it";

for another example, if the configuration of the first in-device coexistence configuration information configured by the source base station for the terminal equipment further includes second configuration information, such as a configured in-device coexistence indication transmission-prohibiting timer is 1 second; in such a case, the terminal equipment may apply the configuration of the first in-device coexistence configuration information, that is, an operational time length of the in-device coexistence indication transmission-prohibiting timer is 1 s;

for still another example, if the configuration of the first in-device coexistence configuration information configured by the source base station for the terminal equipment further includes third configuration information, such as configuration of controlling the terminal equipment to perform autonomous denial of uplink signal transmission of an LTE system is (1 s, 10 times); in such a case, the terminal equipment may apply the configuration of the first in-device coexistence configuration information, that is, the terminal equipment may at most autonomous denial of the uplink signal transmission of an LTE system for 10 times within 1 s;

in this embodiment, step 403 is optional, and is only contained when a case of needing to apply configuration information; for example, when both the second in-device coexistence configuration information and the first in-device coexistence configuration information are configuration information of in-device coexistence indication and values of them are identical, the in-device coexistence indication is reported to the target base station according to the configuration information only when coexistence interference occurs to the terminal equipment and such a problem cannot be solved by itself; and cases for other two types of configuration information are similar to this case, which shall not be described herein any further;

in this embodiment, the method may further include:

step 404: determining that a value of the second in-device coexistence configuration information is different from that of the first in-device coexistence configuration information, when the second in-device coexistence configuration information is contained in the handover command and the number of pieces of the second in-device coexistence configuration information is identical to that of pieces of the first in-device coexistence configuration information;

in this case, as the value of the second in-device coexistence configuration information is different from that of the first in-device coexistence configuration information, the second in-device coexistence configuration information configured by the target base station, that is, the information contained in the handover command, is applied;

furthermore, the method may include:

step 405: applying configuration of the second in-device coexistence configuration information configured by the target base station for the terminal equipment after the terminal equipment is handed over to the target base station; similar to step 403, this step is also optional;

for example, the first configuration information, the second configuration information and the third configuration information configured by the source base station are {permitting the terminal equipment to transmit IDC indication}, {1 s}, {1 s, 10 times}, respectively; and the first configuration information, the second configuration information and the third configuration information configured by the target base station are {permitting the terminal equipment to transmit IDC indication}, {2 s}, {1 s, 5 times}, respectively; and it can be seen therefrom that the configuration of the second in-device coexistence configuration information configured by the target base station for the terminal equipment is different from that of the first in-device coexistence configuration information configured by the source base station for the terminal equipment, and hence the configuration of the second in-device coexistence configuration information is applied;

in this embodiment, when the in-device coexistence configuration information is more than one pieces of information, the method further includes:

step 406: determining by the terminal equipment that a value of the information in the second in-device coexistence configuration information not contained in the handover command is identical to that of corresponding information in the first in-device coexistence configuration information, and that a value of the information in the second in-device coexistence configuration information contained in the handover command is different from that of corresponding information in the first in-device coexistence configuration information, when the second in-device coexistence configuration information is contained in the handover command and the number of pieces of the second in-device coexistence configuration information is different from that of pieces of the first in-device coexistence configuration information;

for example, it corresponds to the case in step 304;

furthermore, the method may include:

step 407: applying configuration (i.e. a numerical value) of the first in-device coexistence configuration information configured by the source base station for the terminal equipment for the information not contained in the handover command after the terminal equipment is handed over to the target base station; and applying configuration (i.e. a numerical value) of the second in-device coexistence configuration information configured by the target base station for the terminal equipment for the information contained in the handover command;

for example, if the second configuration information and the third configuration information are only contained in the handover command, which are {2 s}, {1 s, 5 times}, respectively, for the first configuration information, the terminal equipment applies the value of the first configuration information in the first in-device coexistence configuration information configured by the source base station for it, that is, permitting it to transmit IDC indication; and for the second configuration information and the third configuration information, the terminal equipment applies the values that is {2 s}, {1 s, 5 times}, of the second configuration information and the third configuration information contained in the handover command;

and step 403 is similar to step 405, and step 407 is optional.

It can be seen from the above embodiment that the terminal equipment receives the handover command transmitted by the source base station, and learns the second in-device coexistence configuration information configured by the target base station for the terminal equipment from the handover command; furthermore, the second in-device coexistence configuration information is applied in need.

A person of ordinary skill in the art may understand that all or part of the steps in the method carrying out the above embodiment may be carried out by related hardware instructed by a program. The program may be stored in a computer-readable storage medium. And when being executed, the program may include all or part of the steps in the method in the above embodiment, and the storage medium may include an ROM, an RAM, a floppy disc, and a compact disc, etc.

Embodiments of the present disclosure further provide a base station and terminal equipment, as described in the embodiments below. As the principles of the base station and the terminal equipment for solving problems are similar to those of the above interference indication method based on a base station and terminal equipment, the implementation of the method may be referred to for the implementation of the base station and the terminal equipment, and the repeated parts shall not be described any further.

Figure 5:
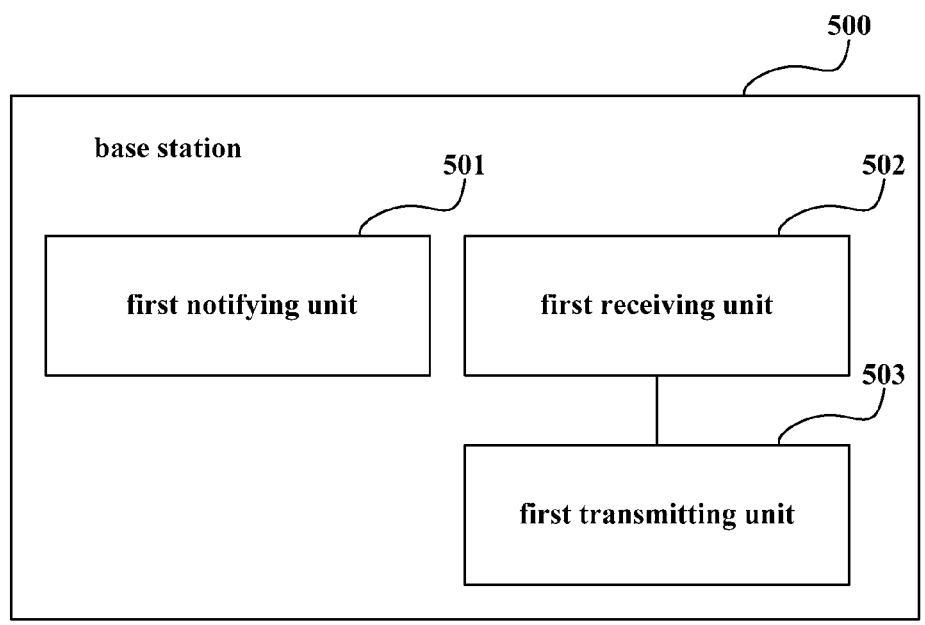
FIG. 5 is a schematic diagram of the structure of a base station of Embodiment 4 of the present disclosure.

FIG. 5 is a schematic diagram of the structure of a base station of Embodiment 4 of the present disclosure. When handover from a source base station to a target base station occurs to terminal equipment, for the source base station, as shown in FIG. 5, the base station 500 includes:

a first notifying unit 501 configured to notify to the target base station, first in-device coexistence configuration information configured by the base station 500 for the terminal equipment, when handover from the base station 500 to the target base station occurs to the terminal equipment.

In this embodiment, the first in-device coexistence configuration information includes first configuration information, and/or second configuration information, and/or third configuration information, with meanings of them being as described in Embodiment 1, which shall not be described herein any further.

In this embodiment, the first notifying unit 501 is further configured to contain the first in-device coexistence configuration information in handover preparation signaling for notifying the target base station.

In this embodiment, the first notifying unit 501 is further configured to configure the first in-device coexistence configuration information in information element "OtherConfig", or in information element "MeasConfig", or in information element "MeasObjectEUTRAConfig", or in information element "RadioResource ConfigDedicated", or to contain the in-device coexistence configuration information in "RRCConnectionReconfiguration" and "AS-Config" as an independent information element.

As shown in FIG. 5, the base station 500 may further include: a first receiving unit 502 and a first transmitting unit 503; wherein, the first receiving unit 502 is configured to receive a handover command transmitted by the target base station in response to the handover preparation signaling notified by the source base station, and the first transmitting unit 503 is configured to notify the handover command to the terminal equipment.

In this embodiment, an operation process of the base station 500 is similar to that described in Embodiment 1, which shall not be described herein any further.

In this embodiment, if the in-device coexistence configuration information includes first configuration information, the first notifying unit 501 is further configured to notify the first configuration information to the target base station permitting the terminal equipment to transmit in-device coexistence indication (IDC indication) to the base station, when handover from the base station to the target base station occurs to the terminal equipment.

Figure 6:
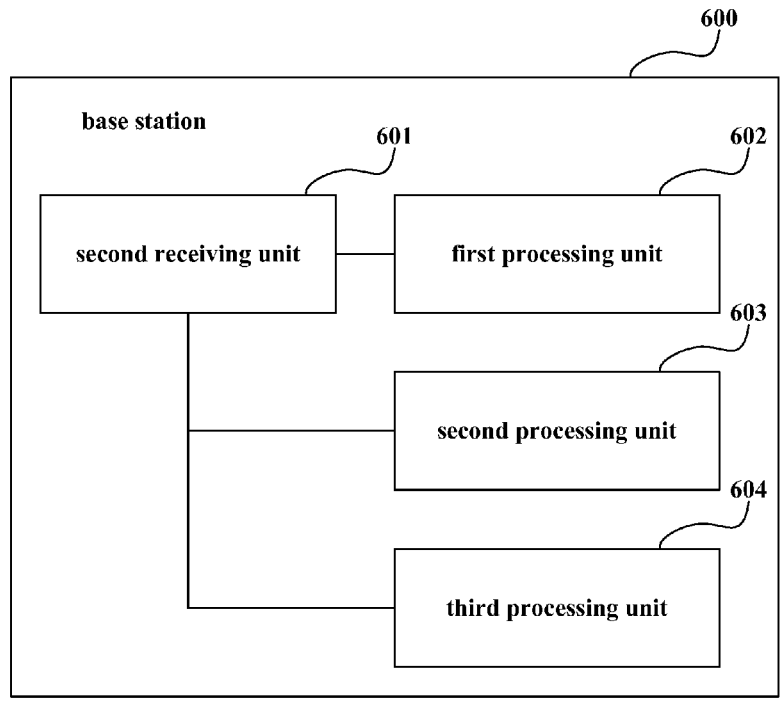
FIG. 6 is a schematic diagram of the structure of a base station of Embodiment 5 of the present disclosure.

FIG. 6 is a schematic diagram of the structure of a base station of Embodiment 5 of the present disclosure. When handover from a source base station to a target base station occurs to terminal equipment, for the target base station, as shown in FIG. 6, the base station 600 includes: a second receiving unit 601 and a first processing unit 602; wherein, the second receiving unit 601 is configured to receive first in-device coexistence configuration information configured by the source base station for the terminal equipment, and the first processing unit 602 is configured not to contain second in-device coexistence configuration information in a handover command, when it is determined to configure the terminal equipment with the second in-device coexistence configuration information and a value of the configured second in-device coexistence configuration information is identical to that of the first in-device coexistence configuration information.

As shown in FIG. 6, the base station 600 further includes: a second processing unit 603 configured to contain the second in-device coexistence configuration information in the handover command, when it is determined to configure the terminal equipment with the second in-device coexistence configuration information and a value of the configured second in-device coexistence configuration information is different from that of the first in-device coexistence configuration information.

As shown in FIG. 6, when the second in-device coexistence configuration information contains more than one pieces of information, the base station 600 further includes a third processing unit 604 configured to contain part of the second in-device coexistence configuration information, a value of which being different from that of the first in-device coexistence configuration information, in a handover command, but not to contain part of the second in-device coexistence configuration information, a value of which being identical to that of the first in-device coexistence configuration information, in the handover command by the target base station, when it is determined to configure the terminal equipment with the second in-device coexistence configuration information and a value of the part of the configured second in-device coexistence configuration information is identical to that of a part of the first in-device coexistence configuration information.

In this embodiment, an operation process of the base station 600 is similar to that described in Embodiment 2, which shall not be described herein any further.

In this embodiment, if the in-device coexistence configuration information includes first configuration information, the second receiving unit 601 is further configured to receive first configuration information transmitted by the source base station permitting the terminal equipment to transmit IDC indication to the source base station; and the first processing unit 602 is further configured to configure the terminal equipment with no information related to the IDC indication and not contain first configuration information of the IDC indication in the handover command, in determining to permit the terminal equipment to transmit the IDC indication to the base station. Furthermore, the second processing unit 603 is further configured to notify the source base station of configuration information not permitting the terminal equipment to transmit the IDC indication to the target base station, in determining not to permit the terminal equipment to transmit the IDC indication to the base station.

In such a case of containing only one piece of configuration information, the third processing unit 604 is not needed. Hence, the third processing unit 604 is optional.

Furthermore, the base station 600 may further include a transmitting unit (not shown) configured to transmit the handover command to the source base station.

Figure 7:
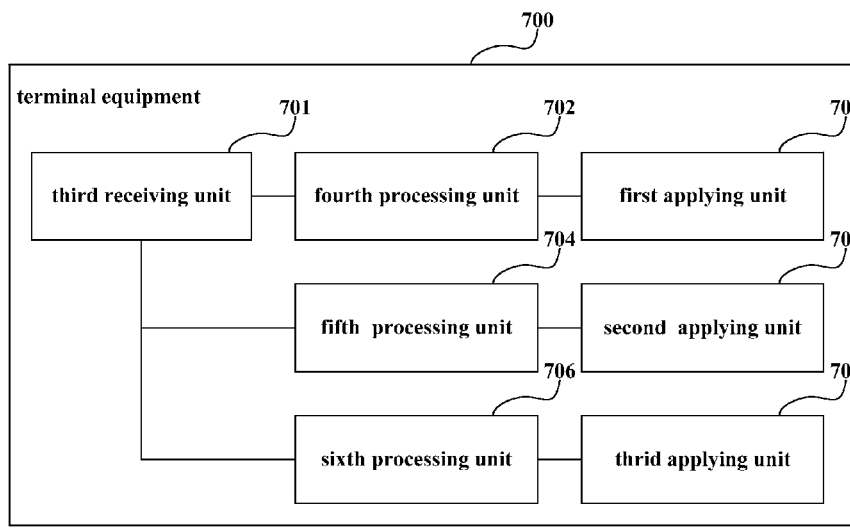
FIG. 7 is a schematic diagram of the structure of terminal equipment of Embodiment 6 of the present disclosure.

FIG. 7 is a schematic diagram of the structure of terminal equipment of Embodiment 6 of the present disclosure. When handover from a source base station to a target base station occurs to terminal equipment, for the terminal equipment, as shown in FIG. 7, the terminal equipment 700 includes: a third receiving unit 701 and a fourth processing unit 702; wherein, the third receiving unit 701 is configured to receive a handover command transmitted by a source base station;

and the fourth processing unit 702 is configured to determine that a value of second in-device coexistence configuration information configured by a target base station for the terminal equipment is identical to that of first in-device coexistence configuration information configured by the source base station for the terminal equipment, when the second in-device coexistence configuration information and an information element "fullConfig" are not contained in the handover command.

As shown in FIG. 7, the terminal equipment 700 further includes:

a first applying unit 703 configured to, after the terminal equipment is handed over to the target base station, apply configuration of the first in-device coexistence configuration information configured by the source base station for the terminal equipment; for example, if the configuration of the first in-device coexistence configuration information configured by the source base station for the terminal equipment is first configuration information, such as permitting the terminal equipment to transmit IDC indication to the source base station, in this case, the terminal equipment may apply the configuration of the first in-device coexistence configuration information, that is, "permitting the terminal equipment to transmit IDC indication to the source base station"; other cases of containing other configuration information shall not be described herein one by one.

Furthermore, the first applying unit 703 is optional.

As shown in FIG. 7, the terminal equipment 700 further includes: a fifth processing unit 704 configured to determine that a value of the second in-device coexistence configuration information configured by the target base station for the terminal equipment is different from that of the first in-device coexistence configuration information, when the second in-device coexistence configuration information is contained in the handover command and the number of pieces of the second in-device coexistence configuration information is identical to that of pieces of the first in-device coexistence configuration information.

In such a case, as the value of the second in-device coexistence configuration information is different from that of the first in-device coexistence configuration information, the second in-device coexistence configuration information configured by the target base station, that is, the information contained in the handover command, is applied.

As shown in FIG. 7, the terminal equipment 700 further includes a second applying unit 705 configured to, after the terminal equipment 700 is handed over to the target base station, apply configuration of the second in-device coexistence configuration information configured by the target base station for the terminal equipment 700.

In this embodiment, the second applying unit 705 is optional.

As shown in FIG. 7, when the in-device coexistence configuration information is more than one pieces of information, the terminal equipment 700 further includes: a sixth processing unit 706 configured to determine that a value of the information in the second in-device coexistence configuration information not contained in the handover command is identical to that of corresponding information in the first in-device coexistence configuration information, and that a value of the information in the second in-device coexistence configuration information contained in the handover command is different from that of corresponding information in the first in-device coexistence configuration information, when the second in-device coexistence configuration information is contained in the handover command and the number of pieces of the second in-device coexistence configuration information is different from that of pieces of the first in-device coexistence configuration information.

Furthermore, the terminal equipment 700 further includes a third applying unit 707 configured to, after the terminal equipment is handed over to the target base station, for the information not contained in the handover command, apply configuration of the first in-device coexistence configuration information configured by the source base station for the terminal equipment and for the information contained in the handover command, apply configuration of the second in-device coexistence configuration information configured by the target base station for the terminal equipment.

In this embodiment, the sixth processing unit 706 and the third applying unit 707 are optional.

In this embodiment, an operational process of the terminal equipment 700 corresponds to Embodiment 3, which shall not be described herein any further.

In this embodiment, if the first in-device coexistence configuration information is the first configuration information "permitting the terminal equipment to transmit IDC indication to the source base station", the third receiving unit 701 is configured to receive the handover command transmitted by the source base station when handover from the source base station to the base station occurs to the terminal equipment; and the fourth processing unit 702 is configured to determine that the value of the second in-device coexistence configuration information is identical to that of the first in-device coexistence configuration information configured by the source base station for the terminal equipment, that is, the target base station permits the terminal equipment to transmit IDC indication, when information related to the IDC indication and the information element "fullConfig" are not contained in the handover command.

The first applying unit 703 is configured to, after the terminal equipment is handed over to the target base station, apply configuration of the first in-device coexistence configuration information configured by the source base station for the terminal equipment; for example, if the first in-device coexistence configuration information configured by the source base station for the terminal equipment is permitting the terminal equipment to transmit IDC indication to the source base station, in this case, the terminal equipment may apply the configuration of the first in-device coexistence configuration information, that is, "permitting the terminal equipment to transmit IDC indication to the source base station"; other cases of containing other configuration information shall not be described herein one by one.

It can be seen from the above embodiment that the source base station notifies the target base station of the first in-device coexistence configuration information configured by it for the terminal equipment. In this way, the target base station receives the first in-device coexistence configuration information, determines whether to configure the terminal equipment with in-device coexistence configuration information, and then notify related configuration information to the target base station via the handover command.

Embodiment 7 of the present disclosure further provides a network system, including terminal equipment, a source base station and a target base station, wherein, the source base station is configured to notify first in-device coexistence configuration information configured by the source base station for the terminal equipment to the target equipment, receive a handover command transmitted by the target base station, and transmit the handover command to the terminal equipment;

the target base station is configured to receive the first in-device coexistence configuration information, and when the target base station is determined to configure the terminal equipment with the second in-device coexistence configuration information and a value of the configured second in-device coexistence configuration information is identical to that of the first in-device coexistence configuration information, the target base station contains no second in-device coexistence configuration information in the handover command and transmits the handover command to the source base station;

and the terminal equipment is configured to receive the handover command transmitted by the source base station, and determine that a value of second in-device coexistence configuration information configured by the target base station for the terminal equipment is identical to that of the first in-device coexistence configuration information configured by the source base station for the terminal equipment, when the second in-device coexistence configuration information and an information element "fullConfig" are not contained in the handover command.

In this embodiment, structures of the source base station, the target base station and the terminal equipment are as described in embodiments 4-6, which shall not be described herein any further.

Figure 8:
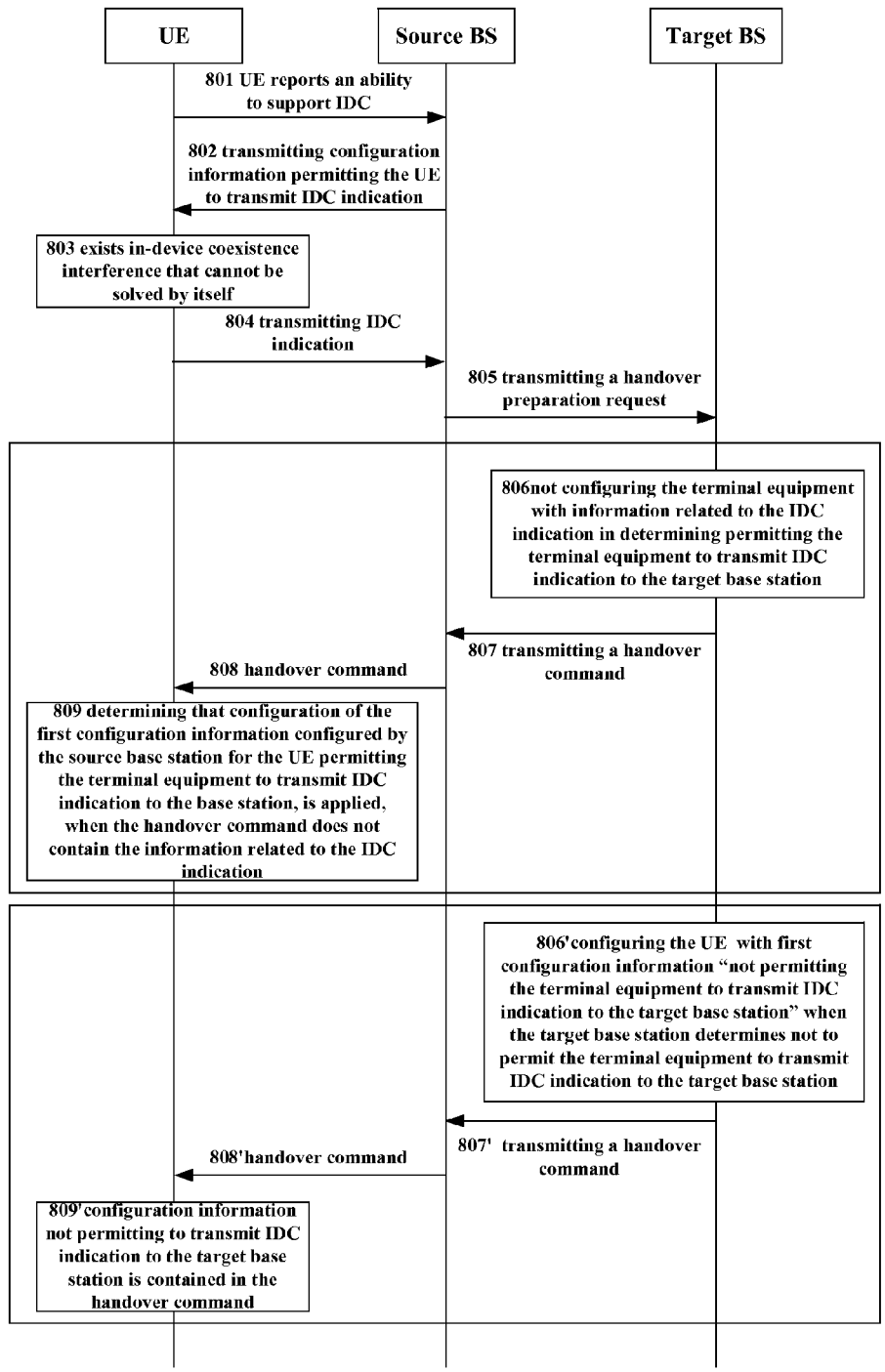
FIG. 8 is a flowchart of a method for processing coexistence configuration information of Embodiment 8 of the present disclosure.

FIG. 8 is a flowchart of a method for processing coexistence configuration information of Embodiment 8 of the present disclosure. Taking the system of Embodiment 7 as an example, description is given for a scenario where handover occurs to terminal equipment taking that in-device configuration information is first configuration information as an example.

As shown in FIG. 8, the method includes:

step 801: reporting an ability to support IDC to an base station by terminal equipment (UE) having an ability of IDC;

wherein, the terminal equipment notifies its ability to support IDC to the base station, the base station being an base station providing service currently, referred to as a source base station;

step 802: transmitting first configuration information "permitting the terminal equipment to transmit IDC indication" by the source base station to the terminal equipment when the source base station judges to permit the terminal equipment to transmit the IDC indication;

step 803: determining by the terminal equipment whether there exists in-device coexistence interference that cannot be solved by itself after the terminal equipment receives the first configuration information "permitting the terminal equipment to transmit IDC indication" configured by the source base station for it;

step 804: transmitting IDC indication to the source base station when there exists in-device coexistence interference that cannot be solved by itself;

steps 801-804 above are similar to steps 201-204 shown in FIG. 2, which shall not be described herein any further;

step 805: transmitting a handover preparation request by the source base station to the target base station when handover from the source base station to the target base station occurs to the terminal equipment;

wherein, the handover preparation request contains "first configuration information of the source base station permitting the terminal equipment to transmit IDC indication to the source base station", and furthermore, the target base station may be notified via another message;

step 806: receiving by the target base station the first configuration information "permitting the terminal equipment to transmit IDC indication to the source base station" transmitted by the source base station, and not configuring the terminal equipment with information related to the IDC indication in determining permitting the terminal equipment to transmit IDC indication to the target base station;

in this case, the second in-device configuration information configured by the target base station for the terminal equipment is identical to the first in-device configuration information configured by the source base station for the terminal equipment;

step 807: transmitting a handover command by the target base station to the source base station;

wherein, the handover command does not contain the first configuration information related to the IDC indication;

step 808: transmitting the handover command by the source base station to the terminal equipment;

wherein, the handover command does not contain the first configuration information related to the IDC indication;

step 809: receiving by the terminal equipment the handover command transmitted by the source base station, and determining that configuration of the first in-device configuration information configured by the source base station for the terminal equipment, that is, "permitting the terminal equipment to transmit IDC indication to the base station", is applied, when the handover command does not contain the information related to the IDC indication;

in this way, when the terminal equipment determines that there exists in-device coexistence interference that cannot be solved by itself, it may transmit the IDC indication to the target base station.

It can be seen from steps 805-809 that when handover occurs to the terminal equipment, after the terminal equipment is handed over from the source base station to the target base station, the terminal equipment may obtain in the above manner that the target base station permits it to transmit the IDC indication.

Furthermore, after step 805, the method may include following steps, in which the terminal equipment is enabled to learn that the target base station does not permit it to transmit the IDC indication, that is, a value of the first configuration information configured by the target base station for the terminal equipment (not permitting) is different from a value of the first configuration information configured by the source base station for the terminal equipment (permitting). As shown in FIG. 8, the steps include:

step 806': receiving by the target base station the first configuration information permitting the terminal equipment to transmit IDC indication to the source base station transmitted by the source base station, and configuring the terminal equipment with first configuration information "not permitting the terminal equipment to transmit IDC indication to the target base station" when the target base station determines not to permit the terminal equipment to transmit IDC indication to the target base station;

step 807': transmitting a handover command by the target base station to the source base station;

wherein, the handover command contains the first configuration information "not permitting to transmit IDC indication to the target base station";

step 808': transmitting the handover command by the source base station to the terminal equipment;

wherein, the handover command contains the first configuration information "not permitting to transmit IDC indication to the target base station";

step 809': receiving by the terminal equipment the handover command transmitted by the source base station, a value of the first configuration information being different from that of the first configuration information configured by the source base station for the terminal equipment when the first configuration information permitting to transmit IDC indication to the target base station is not contained in the handover command.

In this way, when the terminal equipment determines that there exists in-device coexistence interference that cannot be solved by itself, the terminal equipment uses configuration of the first configuration information configured by the target base station for it; in this way, the terminal equipment may not transmit the IDC indication to the target base station.

In this embodiment, an information element used by the configuration information on whether permitting to transmit IDC indication configured by the base station for the terminal equipment may be defined as reportIDCConfig-rll.

In step 805, in order that the source base station is able to transmit the in-device coexistence configuration information configured by it for the terminal equipment to the target base station, following manners may be employed:

(1) containing the in-device coexistence configuration information in "OtherConfig (other configuration information)";

(2) containing the in-device coexistence configuration information in "MeasConfig (measurement configuration information)";

(3) containing the in-device coexistence configuration information in "MeasObjectEUTRAConfig";

(4) containing the in-device coexistence configuration information in "RadioResourceConfigDedicated"; and (5) defining an independent information element for the in-device coexistence configuration information, the information element needing to be contained in RRCConnectionReconfiguration and AS-Config.

The above embodiment is described taking in-device coexistence configuration information containing first configuration information and different cases as examples, where the first configuration information configured by the source base station and the target base station is identical and different. Processing of in-device coexistence configuration information containing more than one pieces of first configuration information, second configuration information and third configuration information and cases where the in-device coexistence configuration information configured by the source base station and the target base station is identical and different is similar to what is described in the embodiment shown in FIG. 8, which shall not be described herein any further.

How to process the in-device coexistence configuration information shall be explained below for cases where the in-device coexistence configuration information contains the first configuration information, the second configuration information and the third configuration information, and a part of the in-device coexistence configuration information configured by the source base station and the target base station is identical and a part is different.

Figure 9:
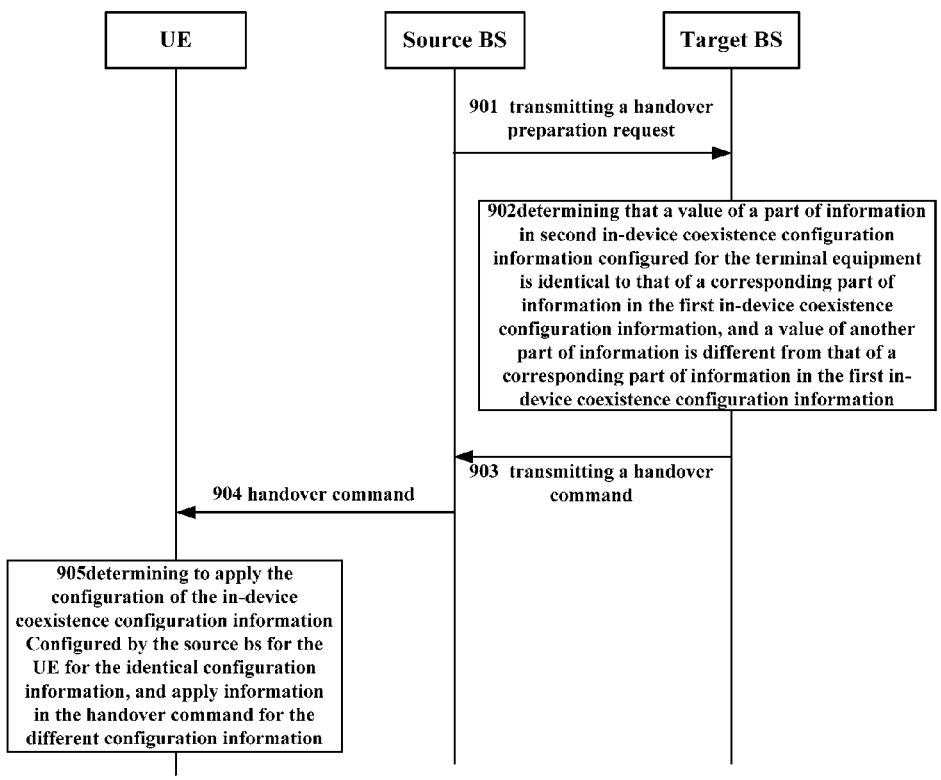
FIG. 9 is a flowchart of a method for processing in-device coexistence configuration information of Embodiment 9 of the present disclosure.

FIG. 9 is a flowchart of a method for processing in-device coexistence configuration information of Embodiment 9 of the present disclosure. And a scenario where handover occurs to terminal equipment shall be described taking the system described in Embodiment 7 as an example.

As shown in FIG. 9, the method includes:

step 901: transmitting a handover preparation request by a source base station to a target base station when handover from the source base station to the target base station occurs to the terminal equipment;

wherein, the handover preparation request contains first in-device coexistence configuration information configured by the source base station for the terminal equipment; in this embodiment, the first in-device coexistence configuration information includes "first configuration information of the source base station permitting the terminal equipment to transmit IDC indication to the source base station"; and it may further include second configuration information and third configuration information, which are as described in the above embodiments, and shall not be described herein any further;

step 902: receiving by the target base station the first in-device coexistence configuration information transmitted by the source base station, and determining in the target base station that a value of a part of information in second in-device coexistence configuration information configured for the terminal equipment is identical to that of a corresponding part of information in the first in-device coexistence configuration information, and a value of another part of information is different from that of a corresponding part of information in the first in-device coexistence configuration information;

for example, the target base station "permits the terminal equipment to transmit IDC indication to the target base station", and at the same time, a value of "configuration information controlling a frequency of the terminal equipment in transmitting in-device coexistence indication" configured for the terminal equipment is identical to that of corresponding information configured by the source base station for the terminal equipment, but a value of configuration information on the terminal equipment performing autonomous denial of uplink signal transmission of an LTE system configured for the terminal equipment is different from that of corresponding information configured by the source base station for the terminal equipment;

step 903: transmitting a handover command to the source base station;

wherein, the handover command contains only information in the second in-device coexistence configuration information configured by the target base station for the terminal equipment with a value different from that of corresponding information in the first in-device coexistence configuration information;

for example, only third configuration information on the terminal equipment performing autonomous denial of uplink signal transmission of an LTE system configured for the terminal equipment is contained;

step 904: transmitting the handover command by the source base station to the terminal equipment;

step 905: receiving the handover command by the terminal equipment, and determining to apply the value of the corresponding information in the first in-device coexistence configuration information for the first configuration information and the second configuration information, and apply information in the handover command for the third configuration information;

furthermore, in step 902, it may also be that the value of "permitting the terminal equipment to transmit IDC indication to the target base station" is identical to that of the corresponding information in the first in-device coexistence configuration information, while the values of the other two types of information are different from that of the corresponding information in the first in-device coexistence configuration information.

What described above are examples only, and it is apparent to a person skilled in the art that other cases are also possible, which shall not be enumerated herein any further.

An embodiment of the present disclosure further provides a computer-readable program, wherein when the program is executed in a base station, the program enables a computer to carry out the method for processing in-device coexistence configuration information as described in embodiments 1 and 8-9 in the base station.

An embodiment of the present disclosure further provides a storage medium in which a computer-readable program is stored, wherein the computer-readable program enables a computer to carry out the method for processing in-device coexistence configuration information as described in embodiments 1 and 8-9 in a base station.

An embodiment of the present disclosure further provides a computer-readable program, wherein when the program is executed in terminal equipment, the program enables a computer to carry out the method for processing in-device coexistence configuration information as described in embodiments 2 and 8-9 in the terminal equipment.

An embodiment of the present disclosure further provides a storage medium in which a computer-readable program is stored, wherein the computer-readable program enables a computer to carry out the method for processing in-device coexistence configuration information as described in embodiments 2 and 8-9 in terminal equipment.

An embodiment of the present disclosure further provides a computer-readable program, wherein when the program is executed in terminal equipment, the program enables a computer to carry out the method for processing in-device coexistence configuration information as described in embodiments 3 and 8-9 in the terminal equipment.

An embodiment of the present disclosure further provides a storage medium in which a computer-readable program is stored, wherein the computer-readable program enables a computer to carry out the method for processing in-device coexistence configuration information as described in embodiments 3 and 8-9 in terminal equipment.

Embodiment 10 of the present disclosure further provides a method for processing in-device coexistence configuration information, including: releasing, by terminal equipment, in-device coexistence configuration information configured by a serving base station for the terminal equipment, when the terminal equipment initiates connection reestablishment.

In this embodiment, the in-device coexistence configuration information includes first configuration information, and/or second configuration information, and/or third configuration information; and wherein, the first configuration information refers to configuration information on whether a source base station permits the terminal equipment to transmit in-device coexistence indication to the source base station;

the second configuration information refers to configuration information configured by the source base station for the terminal equipment and used to control a frequency of the terminal equipment in transmitting in-device coexistence indication;

and the third configuration information refers to configuration information configured by the source base station for the terminal equipment and used to perform autonomous denial of uplink signal transmission of an LTE system for the terminal equipment.

In this embodiment, when the in-device coexistence configuration information includes the first configuration information, the releasing by terminal equipment in-device coexistence configuration information configured by a serving base station for the terminal equipment, includes: releasing, by the terminal equipment, configuration information configured by the serving base station for the terminal equipment on whether permitting the terminal equipment to transmit in-device coexistence indication to the source base station.

In this embodiment, the method further includes: when the in-device coexistence configuration information includes the second configuration information, the releasing by terminal equipment in-device coexistence configuration information configured by a serving base station for the terminal equipment, includes: releasing, by the terminal equipment, configuration information configured by the serving base station for the terminal equipment and used to control a frequency of the terminal equipment in transmitting in-device coexistence indication.

Wherein, if there exists an associated timer in the second configuration information, the releasing the configuration information here further includes deleting the timer.

In this embodiment, the method further includes: when the in-device coexistence configuration information includes the third configuration information, the releasing by terminal equipment in-device coexistence configuration information configured by a serving base station for the terminal equipment, includes: releasing, by the terminal equipment, configuration information configured by the serving base station for the terminal equipment and used to perform autonomous denial of uplink signal transmission of an LTE system for the terminal equipment.

Wherein, if there exists an associated timer in the third configuration information, the releasing the configuration information here further includes deleting the timer.

In this embodiment, the method further includes: not transmitting in-device coexistence indication by the terminal equipment to a new base station, after connection between the terminal equipment and the new base station is reestablished and when the terminal equipment does not receive in-device coexistence configuration information containing fourth configuration information transmitted by the new base station;

wherein the fourth configuration information refers to configuration information on the new base station permitting the terminal equipment to transmit in-device coexistence indication to the new base station.

In this embodiment, the method further includes:

prohibiting, by the terminal equipment, performing autonomous denial of uplink signal transmission of an LTE system, after connection between the terminal equipment and the new base station is reestablished and when the terminal equipment does not receive in-device coexistence configuration information containing fifth configuration information transmitted by the new base station;

wherein the fifth configuration information refers to configuration information configured by the new base station for the terminal equipment and used to perform autonomous denial of uplink signal transmission of an LTE system for the terminal equipment.

Following description is given taking that the in-device coexistence configuration information includes the first configuration information as an example. The other two cases are similar to this, which shall not be described herein any further.

In initiating the connection reestablishment, the terminal equipment releases the configuration information on the serving base station permitting the terminal equipment to transmit the IDC indication to the base station; wherein, the terminal equipment releases reportIDCConfig.

It can be seen from the above embodiment that in a scenario where the terminal equipment performs RRC connection reestablishment, the terminal equipment deletes IDC indication configuration information of the source base station.

Furthermore, the method includes: not transmitting IDC indication by the terminal equipment to the new base station after connection between the terminal equipment and the new base station is reestablished and before the terminal equipment does not receive configuration information transmitted by the new base station permitting the terminal equipment to transmit IDC indication to the new base station.

In this embodiment, the new base station may be a source base station, and may also be another base station. Furthermore, the process of connection reestablishment is similar to the prior art, which shall not be described herein any further.

Figure 10:
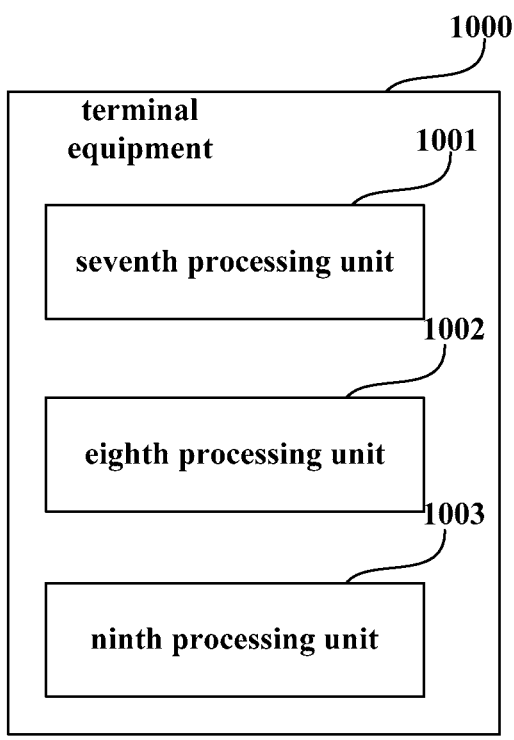
FIG. 10 is a schematic diagram of the structure of terminal equipment of Embodiment 11 of the present disclosure.

FIG. 10 is a schematic diagram of the structure of terminal equipment of Embodiment 11 of the present disclosure. As shown in FIG. 10, the terminal equipment 1000 includes: a seventh processing unit 1001 configured to release in-device coexistence configuration information configured by a serving base station for the terminal equipment, when the terminal equipment initiates connection reestablishment.

The in-device coexistence configuration information includes first configuration information, and/or second configuration information, and/or third configuration information, with the meanings of them being similar to those in Embodiment 10, which shall not be described herein any further.

When the in-device coexistence configuration information includes the first configuration information, the seventh processing unit 1001 is configured to release configuration information configured by the serving base station for the terminal equipment on whether permitting the terminal equipment to transmit in-device coexistence indication to the source base station.

When the in-device coexistence configuration information includes the second configuration information, the seventh processing unit is configured to release configuration information configured by the serving base station for the terminal equipment and used to control a frequency of the terminal equipment in transmitting in-device coexistence indication, and delete the associated timer.

When the in-device coexistence configuration information includes the third configuration information, the seventh processing unit is configured to release configuration information configured by the serving base station for the terminal equipment and used to perform autonomous denial of uplink signal transmission of an LTE system for the terminal equipment, and delete the associated timer.

Wherein, if there exists an associated timer in the third configuration information, the releasing the configuration information here further includes deleting the timer.

As shown in FIG. 10, the terminal equipment 1000 further includes: an eighth processing unit 1002 configured not to transmit in-device coexistence indication to a new base station, after connection between the terminal equipment and the new base station is reestablished and when the terminal equipment does not receive in-device coexistence configuration information containing fourth configuration information transmitted by the new base station; wherein the fourth configuration information refers to configuration information on the new base station permitting the terminal equipment to transmit in-device coexistence indication to the new base station.

As shown in FIG. 10, the terminal equipment 1000 further includes: a ninth processing unit 1003 configured to prohibit performing autonomous denial of uplink signal transmission of an LTE system, after connection between the terminal equipment and the new base station is reestablished and when the terminal equipment does not receive in-device coexistence configuration information containing fifth configuration information transmitted by the new base station; wherein the fifth configuration information refers to configuration information configured by the new base station for the terminal equipment and used to perform autonomous denial of uplink signal transmission of an LTE system for the terminal equipment.

Embodiment 12 of the present disclosure further provides a network system, including a base station, wherein the system further includes terminal equipment, the terminal equipment being the terminal equipment as described in Embodiment 11, and the base station being a source base station or another base station.

With the embodiment above, the problem of how the terminal equipment deals with the in-device coexistence configuration information of the source base station after the terminal equipment initiates the RRC connection reestablishment is solved.

An embodiment of the present disclosure further provides a computer-readable program, wherein when the program is executed in terminal equipment, the program enables a computer to carry out the method for processing in-device coexistence configuration information as described in embodiment 10 in the terminal equipment.

An embodiment of the present disclosure further provides a storage medium in which a computer-readable program is stored, wherein the computer-readable program enables a computer to carry out the method for processing in-device coexistence configuration information as described in embodiment 10 in terminal equipment.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. A method for processing in-device coexistence configuration information during a radio resource control (RRC) connection reestablishment procedure, comprising:
   releasing, by terminal equipment, in-device coexistence configuration information configured by a serving base station for the terminal equipment, when the terminal equipment initiates RRC connection reestablishment, the in-device coexistence configuration information indicating whether the serving base station permits the terminal equipment to transmit in-device coexistence indication to the serving base station and the configuration information to control the terminal equipment to perform autonomous denial of uplink signal transmission of an LTE system; and
   not transmitting in-device coexistence indication by the terminal equipment to a new base station, when connection between the terminal equipment and the new base station is reestablished and the terminal equipment does not receive in-device coexistence configuration information containing first configuration information transmitted by the new base station, wherein the first configuration information refers to configuration information configured by the new base station to indicate a permission to transmit in-device coexistence indication to the new base station by the terminal equipment.

2. The method according to claim 1, wherein the method further comprises:
   prohibiting the terminal equipment from performing autonomous denial of uplink signal transmission of an LTE system, when connection between the terminal equipment and the new base station is reestablished and the terminal equipment does not receive in-device coexistence configuration information containing second configuration information transmitted by the new base station, wherein the second configuration information refers to configuration information configured by the new base station for the terminal equipment and controls autonomous denial of uplink signal transmission of the LTE system for the terminal equipment.

3. Terminal equipment, comprising:
   processing circuitry configured to:
   release in-device coexistence configuration information configured by a serving base station for the terminal equipment, when the terminal equipment initiates RRC connection reestablishment, the in-device coexistence configuration information indicating whether the serving base station permits the terminal equipment to transmit in-device coexistence indication to the serving base station and the configuration information to control the terminal equipment to perform autonomous denial of uplink signal transmission of an LTE system; and not to transmit in-device coexistence indication to a new base station, when connection between the terminal equipment and the new base station is reestablished and the terminal equipment does not receive in-device coexistence configuration information containing first configuration information transmitted by the new base station, wherein the first configuration information refers to configuration information configured by the new base station to indicate a permission to transmit in-device coexistence indication to the new base station by the terminal equipment.

4. The terminal equipment according to claim 3, wherein the processing circuitry is further configured to:

prohibit performing autonomous denial of uplink signal transmission of an LTE system, when connection between the terminal equipment and the new base station is reestablished and the terminal equipment does not receive in-device coexistence configuration information containing second configuration information transmitted by the new base station, wherein the second configuration information refers to configuration information configured by the new base station for the terminal equipment and controls autonomous denial of uplink signal transmission of the LTE system for the terminal equipment.

5. A network system, comprising:

a base station, and terminal equipment configured to:

release in-device coexistence configuration information configured by a serving base station for the terminal equipment, when the terminal equipment initiates RRC connection reestablishment, the in-device coexistence configuration information indicating whether the serving base station permits the terminal equipment to transmit in-device coexistence indication to the serving base station and the configuration information to control the terminal equipment to perform autonomous denial of uplink signal transmission of an LTE system; and not to transmit in-device coexistence indication to a new base station, when connection between the terminal equipment and the new base station is reestablished and the terminal equipment does not receive in-device coexistence configuration information containing first configuration information transmitted by the new base station, wherein the first configuration information refers to configuration information configured by the new base station to indicate a permission to transmit in-device coexistence indication to the new base station by the terminal equipment.

* * * * *